(12) United States Patent
Baranda

(10) Patent No.: US 11,208,050 B1
(45) Date of Patent: Dec. 28, 2021

(54) EXPANDABLE CARGO CARRIER

(71) Applicant: Felix Baranda, Miami, FL (US)

(72) Inventor: Felix Baranda, Miami, FL (US)

( * ) Notice: Subject to any disclaimer, the term of this patent is extended or adjusted under 35 U.S.C. 154(b) by 0 days.

(21) Appl. No.: 17/000,002

(22) Filed: Aug. 21, 2020

(51) Int. Cl.
*B60R 9/06* (2006.01)

(52) U.S. Cl.
CPC ...................... *B60R 9/06* (2013.01)

(58) Field of Classification Search
CPC .......................................... B60R 9/06
USPC .......................................... 224/501
See application file for complete search history.

(56) References Cited

U.S. PATENT DOCUMENTS

| | | | | |
|---|---|---|---|---|
| 1,585,871 A * | 5/1926 | Pels | ......................... | H01M 2/06 224/497 |
| 1,686,450 A * | 10/1928 | Henry | ..................... | B60R 5/041 224/498 |
| 4,676,415 A * | 6/1987 | Kennedy | ................ | B62D 43/04 224/42.21 |
| 5,460,304 A | 10/1995 | Porter | | |
| 5,579,973 A * | 12/1996 | Taft | ........................... | B60R 9/06 224/495 |
| 5,676,292 A * | 10/1997 | Miller | ....................... | B60R 9/06 224/282 |
| 6,095,387 A | 8/2000 | Lipscomb | | |
| 6,524,054 B2 * | 2/2003 | Maney | .................. | B60P 1/4421 224/519 |
| 6,712,248 B2 * | 3/2004 | Mitchell | ................... | B60R 9/06 224/498 |
| 7,992,751 B1 * | 8/2011 | Sweeney | .................. | B60R 9/06 224/497 |
| 9,027,809 B1 * | 5/2015 | Ezra | ......................... | B60R 9/06 224/519 |
| 9,636,958 B2 * | 5/2017 | Patterson | ................ | E04H 15/56 |
| 10,086,768 B2 * | 10/2018 | Ritter, Jr. | .................. | B60R 9/10 |
| 2006/0170180 A1 * | 8/2006 | Collins | ...................... | B60R 9/06 280/166 |
| 2008/0006667 A1 * | 1/2008 | Bergerhoff | ................ | B60R 9/06 224/533 |
| 2008/0142559 A1 * | 6/2008 | Lim | ........................... | B60R 9/06 224/489 |
| 2008/0231029 A1 * | 9/2008 | Hummel | ................... | B60R 9/06 280/769 |
| 2009/0140024 A1 * | 6/2009 | McLemore | ............... | B60R 9/06 224/519 |

(Continued)

*Primary Examiner* — Peter N Helvey

(74) *Attorney, Agent, or Firm* — Sanchelima & Associates, P.A.; Christian Sanchelima; Jesus Sanchelima

(57) ABSTRACT

A system for an expandable cargo carrier including a carrier assembly, a communication assembly and a vehicle assembly is disclosed. The carrier assembly includes a carrier that is secured to a vehicle of the vehicle assembly with an attaching member. The carrier includes a floor defined by telescopic members. The telescopic members expand or retract to achieve an expanded or retracted configuration, respectively, for the carrier. The carrier is expanded or retracted through manual or automatic means. The communication assembly includes a motor that is engaged to expand or retract the telescopic members automatically. Additionally, communication assembly permits carrier to be sized remotely. Alternatively, telescopic members are expanded or retracted through manual manipulation of the telescopic members. Carrier is sized as necessary by a user to accommodate a cargo load to be transported within carrier.

16 Claims, 4 Drawing Sheets

(56) References Cited

U.S. PATENT DOCUMENTS

| | | | |
|---|---|---|---|
| 2011/0108592 A1* | 5/2011 | Lee | B60R 9/10 |
| | | | 224/488 |
| 2012/0024923 A1* | 2/2012 | Cha | B60R 9/06 |
| | | | 224/533 |
| 2013/0182454 A1* | 7/2013 | Hofmann | B60R 9/10 |
| | | | 362/549 |
| 2015/0321716 A1* | 11/2015 | Patterson | E04H 15/56 |
| | | | 296/26.09 |
| 2016/0121938 A1* | 5/2016 | Richins | B60P 3/40 |
| | | | 296/26.09 |
| 2016/0152190 A1* | 6/2016 | Lee | B62D 35/02 |
| | | | 224/489 |
| 2017/0166139 A1* | 6/2017 | Cha | B60R 9/06 |
| 2019/0202368 A1* | 7/2019 | Partyka | B60R 9/06 |

* cited by examiner

EXPANDABLE CARGO CARRIER

BACKGROUND OF THE INVENTION

1. Field of the Invention

The present invention relates to an expandable cargo carrier and, more particularly, to a cargo carrier having a floor that is capable of expanding or retracting to accommodate different sized loads.

2. Description of the Related Art

Several designs for cargo carriers have been designed in the past. None of them, however, include a cargo carrier that is compact due to having a floor defined by telescopic members that permit the floor to expand or retract as needed to accommodate different sized loads as required by the user.

Applicant believes that a related reference corresponds to U.S. Pat. No. 5,460,304 for a modular vehicular carrier system. Applicant believes that another related reference refers to U.S. Pat. No. 6,095,387 for a multipurpose carrier. None of these references, however, teach of cargo carrier having a floor defined by telescopic members that permit expansion and retraction of the cargo carrier to accommodate different sized cargos as needed by the user.

Other documents describing the closest subject matter provide for a number of more or less complicated features that fail to solve the problem in an efficient and economical way. None of these patents suggest the novel features of the present invention.

SUMMARY OF THE INVENTION

It is one of the objects of the present invention to provide an expandable cargo carrier that can accommodate different sized loaded.

It is another object of this invention to provide an expandable cargo carrier that is can be retrofitted onto existing vehicles.

It is still another object of the present invention to provide an expandable cargo carrier that is portable.

It is yet another object of this invention to provide such a device that is inexpensive to implement and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE EMBODIMENTS OF THE INVENTION

Figure 1:
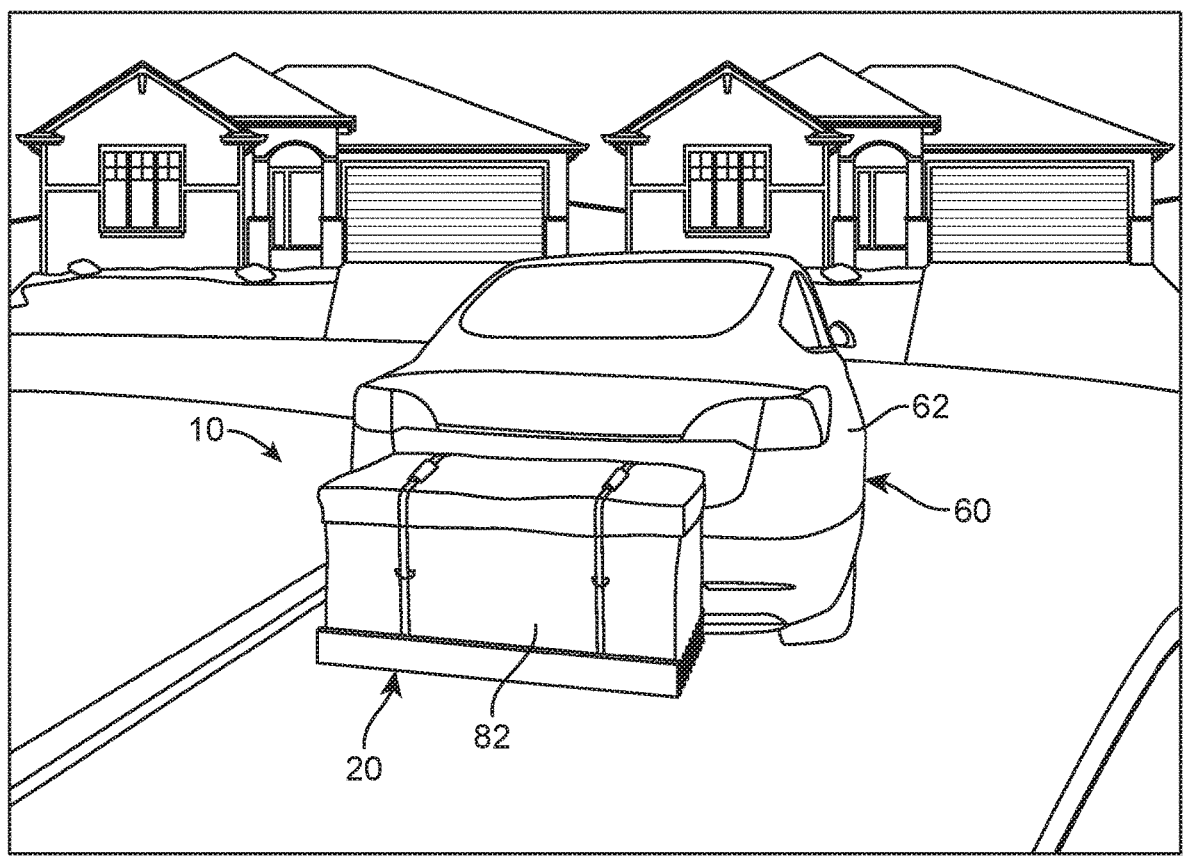
FIG. 1 represents an operational view of the expandable cargo carrier 10 in an operational view mounted to vehicle 62 containing cargo load 82 therein.

Referring now to the drawings, where the present invention is generally referred to with numeral 10, it can be observed that an expandable cargo carrier 10 basically includes a carrier assembly 20, a communications assembly 40 and a vehicle assembly 60.

As best seen in FIG. 1, expandable cargo carrier 10 may be removably mounted to a vehicle 62 of vehicle assembly 60. Preferably, expandable cargo carrier 10 may be secured to a rear of vehicle 62. Mounted and secured within expandable cargo carrier 10 may be a cargo load 82. Expandable cargo carrier 10 may be expanded or retracted to accommodate cargo load 82 thereon. Expandable cargo carrier 10 may also be retracted for compactness during storage.

Figure 2:
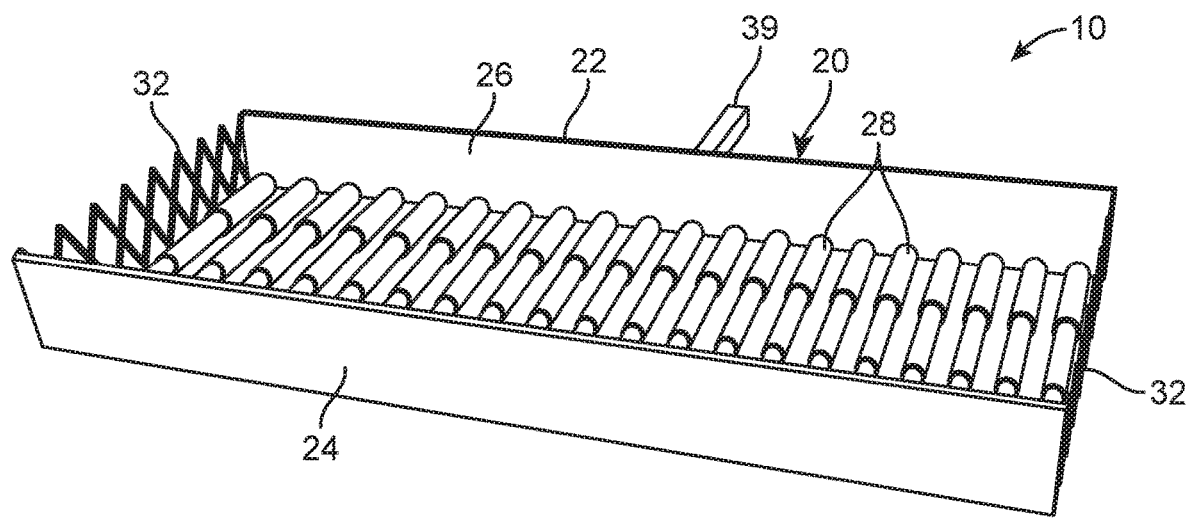
FIG. 2 shows an isometric view of expandable cargo carrier 10 in the expanded configuration.
Figure 3:
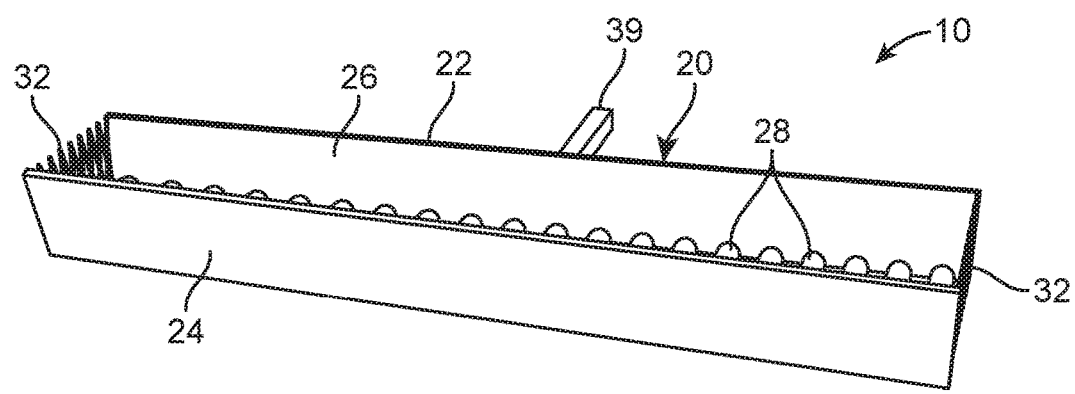
FIG. 3 illustrates an isometric view of expandable cargo carrier 10 in the retracted configuration.

As best seen in FIGS. 2-3, carrier assembly 20 may include carrier 22. Carrier 22 may be used to facilitate the storing and transportation of cargo load 82 as needed by a user. Carrier 22 may have an expanded configuration as best seen in FIG. 2. It is to be understood that carrier 22 may be extended to different dimensions as need by the user. Carrier 22 may also have a retracted configuration as best seen in FIG. 3. The expanded or retracted configuration may be achieved by automatic or manual means. Cargo load 82 may be secured onto carrier 22 with different fastening means as necessary. In one implementation, carrier 22 may have a rectangular configuration. It may be suitable for carrier 22 to be made of materials such as metal, plastic, rubber aluminum, wood, or combinations thereof.

Carrier 22 may have a front wall 24 and a rear wall 26. It is to be understood that front wall 24 and rear wall 26 may be identical to each other. Front wall 24 and rear wall 26 may be parallel to one another. The distance between front wall 24 and rear wall 26 may change as carrier 22 is being adjusted when front wall 24 and rear wall 26 move towards and away from each other. Additionally, front wall 24 and rear wall 26 may preferably be solid.

Figure 4:
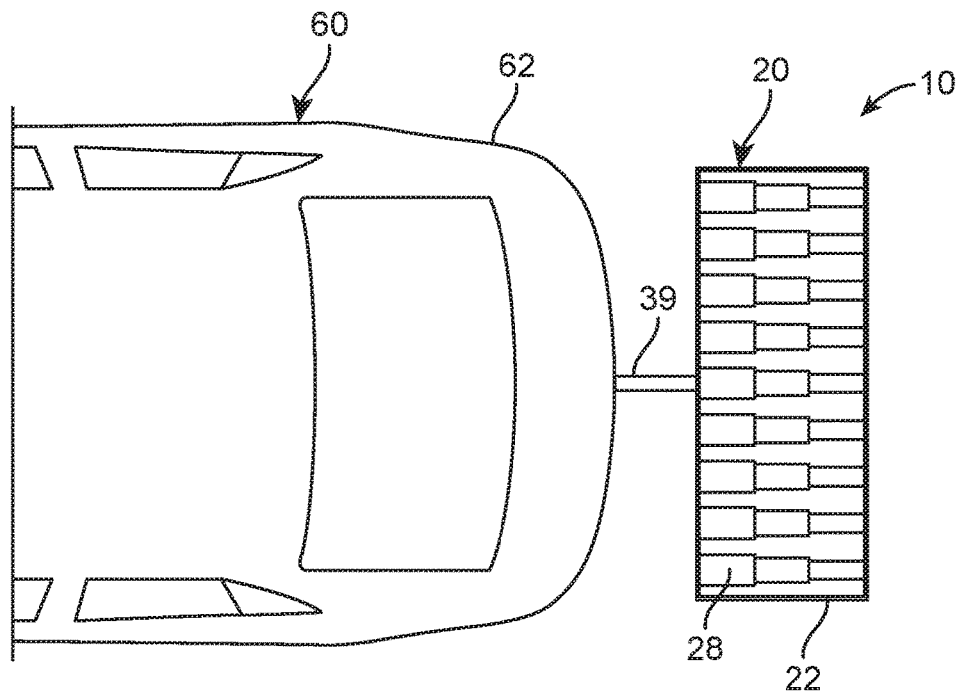
FIG. 4 shows a top view of expandable cargo carrier in the expanded configuration.

As best seen in FIGS. 2-4, telescopic members 28 may be secured and extend between front wall 24 and rear wall 26. It is to be understood that the distal ends of each of telescopic members 28 may be in constant abutting contact with front wall 24 and rear wall 26. Importantly, telescopic members 28 may define a floor of carrier 22. Cargo load 82 may be supported on telescopic members 28. Telescopic members 28 may be evenly spaced apart, adjacent and parallel to each other. Telescopic member 28 may preferably be cylindrical in shape. To accommodate cargo load 82 within carrier 22, telescopic members 28 may expand or retract to size carrier 22 as needed. Expansion or retraction of telescopic members 28 may suitably be achieved by automatic or manual means. Front wall 24 may be pulled away from rear wall 26 to expand telescopic members 28 by manual means. Front wall 24 may be pushed towards rear wall 26 to retract telescopic members 28 by manual means. Telescopic members 28 permit carrier 22 to achieve the expanded or retracted configuration. It is to be understood that telescopic members 28 may cooperate with communication assembly 40 for expanding or retracting of carrier 22 through automatic means.

Figure 5:
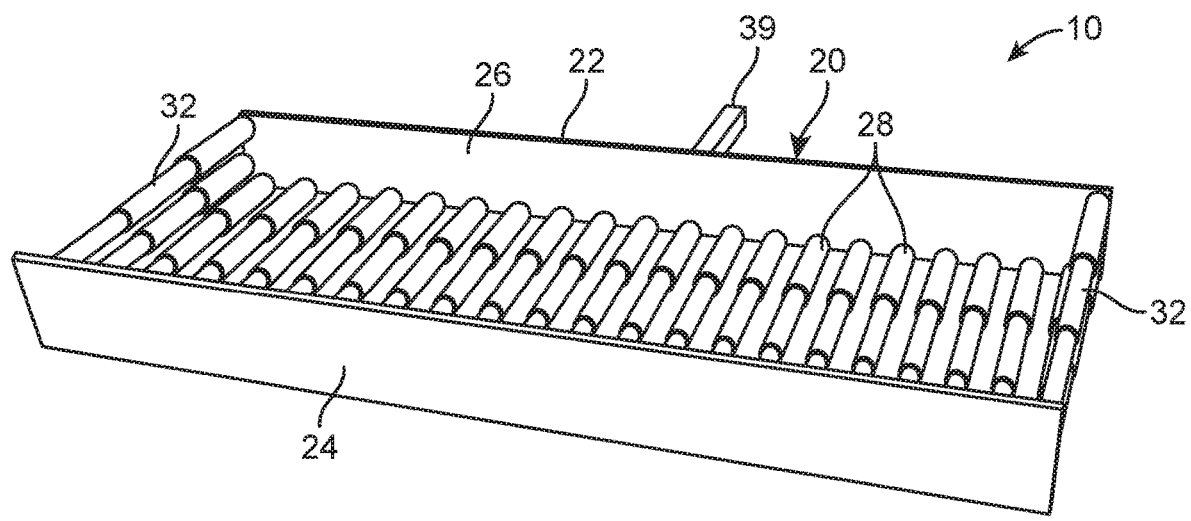
FIG. 5 is a representation of an alternate embodiment of expandable cargo carrier 10 with telescopic sidewalls.

On lateral sides of carrier 22 may be sidewalls 32, which may help to maintain cargo load 82 within carrier 22. Sidewalls 32 may extend between front wall 24 and rear wall 26. The distal ends of each of sidewalls 32 may be in constant abutting contact with front wall 24 and rear wall 26. Sidewalls 32 may be parallel to each other and to telescopic members 28. It may be suitable for sidewalls 32 to extend a height of carrier 22. Sidewalls 32 may be able to expand and retract simultaneously with telescopic members 28. Sidewalls 32 may expand when carrier 22 is in use. Preferably telescopic members 28 and sidewalls 32 may be able to expand a same length. Sidewalls 32 may collapse when carrier 22 is being stored. In one embodiment, sidewalls 32 may be in an expanding scissor gate configuration, as best seen in FIGS. 2-3. In an alternate embodiment, sidewalls 32 may be in a telescoping sidewall configuration as best seen in FIG. 5. In the alternate embodiment of FIG. 5, sidewalls 32 may be made of additional of telescopic members 28. The additional of telescopic members 28 that define sidewalls 32 may be entirely above of telescopic members 28 that define the floor of carrier 22.

Figure 6:
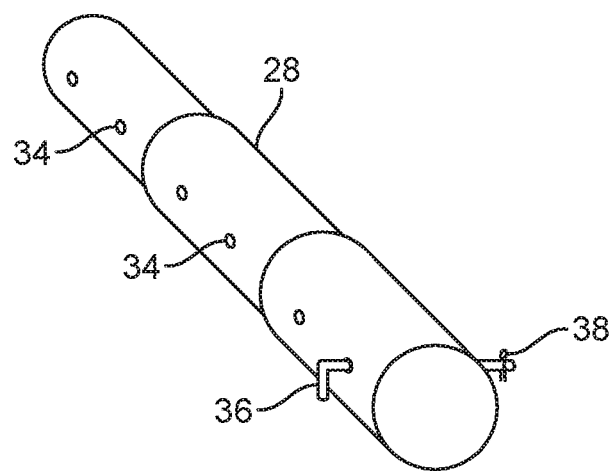
FIG. 6 illustrates a zoomed in view of one of telescopic members 28 with pin 36 extending through used to size carrier 22 as desired by preventing carrier 22 from expanding or retracting.
Figure 7:
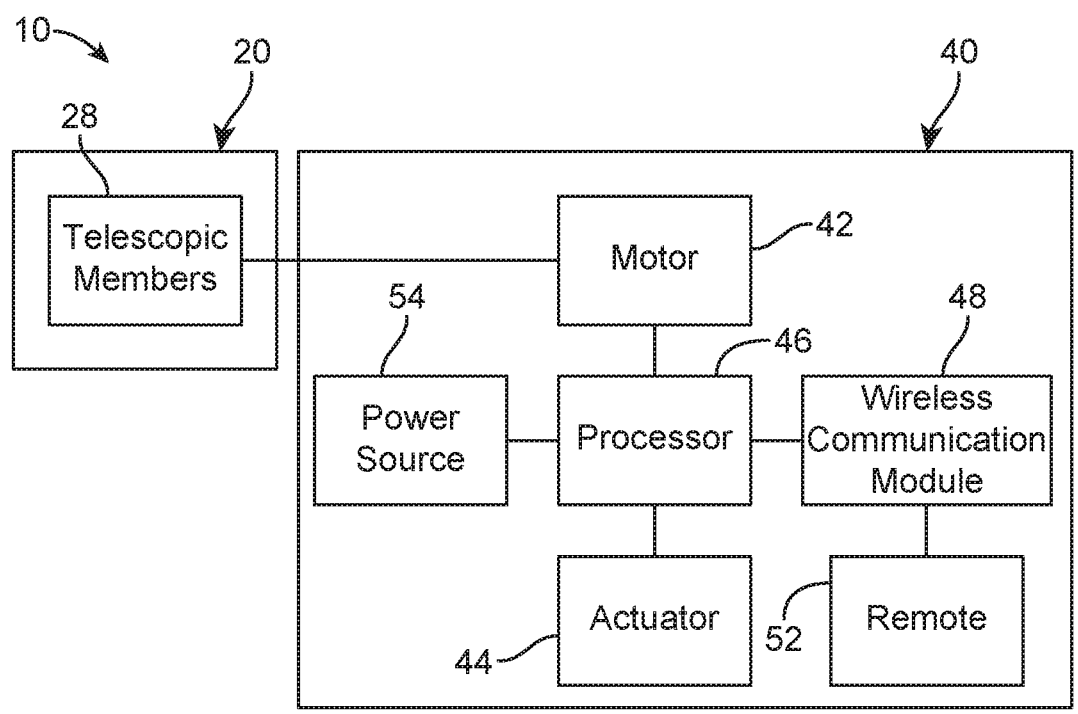
FIG. 7 represents a diagram of communication assembly 40.

Importantly, one of telescopic members 28 may be used to lock carrier 22 in the expanded configuration as needed. As best illustrated in FIG. 6, the preselected of telescopic members 28 may include openings 34 extending a length thereof. In the preferred implementation, the centrally located of telescopic members 28 may preferably include openings 34. When telescopic members 28 have been expanded as necessary to size carrier 22, a pin 36 may extend through the appropriate and selected one of openings 34. Thereby preventing carrier 22 from expanding or retracting as pin 36 prevents movement of telescopic members 28. Pin 36 may extend perpendicularly through one of telescopic members 28 having openings 34. Pin 26 may have an L shaped configuration for ease of grasping when inserting or retrieving pin 36 from one of openings 34. A clip 38 may be secured to pin 36 at a distalmost end thereof. Clip 38 ensures that pin 36 remains within the selected of openings 34 attached to one of telescopic members 28. Clip 38 helps to prevent pin 36 coining loose to prevent accidental expanding or collapsing of carrier 22. Clip 36 may be perpendicular to pin 36.

Further included in carrier assembly 20 may be an attaching member 39. Attaching member 39 may be attached to a rear side of carrier 22. Attaching member 39 may be used to attach carrier 22 to vehicle 62. Attaching member 39 may be received by a hitch of vehicle 62. Attaching member 39 may be of a shape that cooperates with the hitch of vehicle 62. Attaching member 39 may alternatively be referred to as a hitch attachment. Attaching member 39 may extend outwardly and away from carrier 22. Attaching member 39 may be perpendicular to carrier 22, in the preferred embodiment. Attaching member 39 may be made of square tubing in one embodiment.

It is to be understood that expandable cargo carrier 10 may include communication assembly 40 which may be used to achieve the expanded or retracted configuration for carrier 22. Communication assembly 40 may assist carrier to achieve the expanded or retracted configuration through automatic means. Communication assembly 40 may include a motor 42, an actuator 44, a processor 46, a wireless communications module 48, a remote 52 and a power source 54. It is to be understood that all components of communication assembly 40 may be interconnected by electrical wires.

Motor 42 may be used to automatically extend or retract telescopic members 28. It is to be understood that motor 42 may be a solenoid motor in one embodiment.

Attached to processor 46 may further be wireless communication module 48. Wireless communication module 48 may allow for wirelessly controlling of motor 42 to expand or retract carrier 22 from inside of vehicle 62 or a remote location. Wireless communication module 48 may be capable of wireless communication such as Bluetooth, Wi-Fi, radio broadcast (RF), infrared (IR), satellite, microwave or the like. Wireless control of motor 42 may be achieved by remote 52. Remote 52 may communicate with motor 42 through wireless communication module 48 to permit for motor 42 to be actuated remotely. In one embodiment, remote 42 may be a mobile device. Power source 54 may be a battery that provides power to components of communication assembly 40. Power source 54 may be connected to processor 46.

Expandable cargo carrier 10 may be attached and retrofitted onto vehicle 62. Expandable cargo carrier 10 may be expanded or retracted to accommodate cargo load 82 as needed. The floor of carrier 22 is defined by telescopic members 28 that allow for the expanded or retracted configuration to be achieved. It may be suitable to size carrier 22 and telescopic members 28 as necessary though automatic or manual means.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A system for a carrier, comprising:
   a. a carrier assembly including a carrier, said carrier having an expanded configuration and a retracted configuration, said carrier having telescopic members which define a floor of said carrier, wherein said telescopic members are parallel cylindrical members, said expanded configuration and said retracted configuration achieved through manual means wherein said telescopic members are expanded or retracted manually, one of said telescopic members defining said floor including openings extending along a length thereof, said carrier assembly further including a pin, said pin extending perpendicularly through one of said openings to size said carrier as needed and prevent said carrier from expanding or retracting accidentally, wherein said carrier includes a front wall and a rear wall, said telescopic members extending perpendicularly between said front wall and said rear wall, said front wall moving away from and towards said rear wall to achieve said expanded configuration and retracted configuration, respectively, said front wall and said rear wall each being rigid members including a continuous surface with four perimeter edges respectively arranged in alignment on opposing distal ends of the telescopic members, said front wall is connected to said rear wall using only said telescopic members, said telescopic members located entirely between the front wall and the rear wall in both the expanded configuration and the retracted configuration; and
   b. a cargo load secured onto said carrier for transportation thereof, said carrier including said telescopic members to increase the dimensions of said carrier as said telescopic members are extended and retracted.

2. The system of claim 1, wherein said carrier includes sidewalls defined by telescopic members adjacent to lateral edges of the rear wall and the front wall that expand and retract simultaneously with said telescopic members.

3. The system of claim 2, wherein said sidewalls are telescopic sidewalls, said telescopic sidewalls defined by additional of said telescopic members, the additional of said telescopic members being entirely above of said telescopic members defining said floor, a series of spacings intermediately located between said telescopic members defining said floor and the additional of said telescopic members defining said telescopic sidewalls.

4. The system of claim 1, wherein said carrier achieves said expanded configuration and said retracted configuration through automatic means with a communication assembly including a motor, said motor attached to said telescopic members to expand or retract said telescopic members to achieve the expanded configuration or the retracted configuration automatically.

5. The system of claim 1 wherein said pin protrudes from lateral sides of the one of said telescopic members extending therethrough.

6. The system of claim 1, wherein a clip is attached to a distal end of said pin extending through one of said openings to secure said pin within the selected of said openings.

7. The system of claim 6, wherein said clip is perpendicular to said pin, said clip being partially exposed from above and below of said pin when secured thereto.

8. The system of claim 1, wherein an attaching member is centrally attached to said carrier on a rear side thereof, said attaching member extending outwardly and away from said carrier and being perpendicular to said carrier, said attaching member securing said carrier to a vehicle.

9. The system of claim 4, wherein said communication assembly includes an actuator, a processor, a wireless communications module, a remote and a power source.

10. The system of claim 9, wherein the actuator is actuated to activate or deactivate said motor to expand or retract said carrier.

11. The system of claim 9, wherein said processor interconnects said motor and said actuator allowing said motor and said actuator to communicate to extend or retract said telescopic members and said carrier.

12. The system of claim 9, wherein mounted to said processor is said wireless communication module, said wireless communication module communicating with said remote, said wireless communication module permitting wireless control of said motor with said remote to expand or retract carrier remotely.

13. The system of claim 9, wherein said wireless communication module is capable of wireless communication through Bluetooth, Wi-Fi, radio broadcast (RF), infrared (IR), satellite, or microwave.

14. The system of claim 9, wherein said actuator, said wireless communications module, said power source and said motor are connected to said processor, said power source provides energy to said actuator, said wireless communications module, said power source, said motor and said processor.

15. The system of claim 1, wherein said telescopic members are evenly spaced apart and parallel to each other.

16. A system for a carrier, consisting of:
a) carrier assembly including a carrier, said carrier having an expanded configuration and a retracted configuration, said carrier having telescopic members which define a floor of said carrier, wherein said telescopic members are parallel cylindrical members, said expanded configuration and said retracted configuration achieved through manual means wherein said telescopic members are expanded or retracted manually, one of said telescopic members defining said floor including openings extending along a length thereof, said carrier assembly further including a pin, said pin extending perpendicularly through one of said openings to size said carrier as needed and prevent said carrier from expanding or retracting accidentally, wherein said carrier includes a front wall and a rear wall, said telescopic members extending perpendicularly between said front wall and said rear wall, said front wall moving away from and towards said rear wall to achieve said expanded configuration and retracted configuration, respectively, wherein said front wall and said rear wall each being rigid members including a continuous surface with four perimeter edges respectively arranged in alignment on opposing distal ends of the telescopic members, said front wall is connected to said rear wall using only said telescopic members, said telescopic members located entirely between the front wall and the rear wall in both the expanded configuration and the retracted configuration, wherein said carrier includes sidewalls that expand and retract simultaneously with said telescopic members, wherein said sidewalls are telescopic sidewalls, said telescopic sidewalls defined by additional of said telescopic members, the additional of said telescopic members being entirely above of said telescopic members defining said floor, a series of spacings intermediately located between said telescopic members defining said floor and the additional of said telescopic members defining said telescopic sidewalls; and
b) a cargo load secured onto said carrier for transportation thereof.

* * * * *